(12) United States Patent
Brookes

(10) Patent No.: US 9,234,557 B2
(45) Date of Patent: Jan. 12, 2016

(54) FLEXIBLE SPRING MEMBER AS WELL AS GAS SPRING ASSEMBLY AND METHOD OF MANUFACTURE

(71) Applicant: Firestone Industrial Products Company, LLC, Indianapolis, IN (US)

(72) Inventor: Graham R. Brookes, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 122 days.

(21) Appl. No.: 13/959,661

(22) Filed: Aug. 5, 2013

(65) Prior Publication Data

US 2014/0035210 A1    Feb. 6, 2014

Related U.S. Application Data

(60) Provisional application No. 61/679,621, filed on Aug. 3, 2012.

(51) Int. Cl.

| F16F 5/00  | (2006.01) |
|---|---|
| B60G 11/26 | (2006.01) |
| F16F 9/04  | (2006.01) |
| B60G 11/27 | (2006.01) |
| F16F 9/05  | (2006.01) |
| F16F 9/32  | (2006.01) |

(52) U.S. Cl.
CPC .............. *F16F 9/0409* (2013.01); *B60G 11/27* (2013.01); *F16F 9/05* (2013.01); *F16F 9/3292* (2013.01); *B60G 2202/152* (2013.01); *B60G 2206/42* (2013.01)

(58) Field of Classification Search
USPC .......................... 267/64.19, 64.23–64.28, 120
See application file for complete search history.

(56) References Cited

U.S. PATENT DOCUMENTS

| 6,036,179 | A  | * | 3/2000 | Rensel ........................ 267/64.11 |
|---|---|---|---|---|
| 7,497,422 | B2 | * | 3/2009 | Egolf et al. ................. 267/64.11 |
| 8,800,974 | B2 | * | 8/2014 | Howard et al. ............. 267/64.23 |
| 2006/0043196 | A1 | * | 3/2006 | Trowbridge ................... 235/487 |

\* cited by examiner

*Primary Examiner* — Christopher Schwartz
(74) *Attorney, Agent, or Firm* — Jason A. Houser; Fay Sharpe LLP

(57) ABSTRACT

Flexible spring members can be dimensioned for securement to an associated gas spring end member. The flexible spring member can be at least partially formed from elastomeric material. The flexible spring member can also include a marking disposed along a surface thereof that includes one or more indicia. The marking can be at least partially formed by an indicia layer and an outer layer. The indicia layer can include one or more quantities of material that at least partially form the one or more indicia. The outer layer can be formed from a quantity of material that is disposed overtop of the indicia layer such that the one or more indicia of the indicia layer are substantially encapsulated. Gas spring assemblies, suspension systems, methods of manufacture and manufacturing systems are also included.

13 Claims, 10 Drawing Sheets

FLEXIBLE SPRING MEMBER AS WELL AS GAS SPRING ASSEMBLY AND METHOD OF MANUFACTURE

This application claims the benefit of U.S. Provisional Patent Application No. 61/679,621, filed on Aug. 3, 2012, the entire contents of which is hereby incorporated herein by reference.

BACKGROUND

The subject matter of the present disclosure broadly relates to the art of gas spring devices and, more particularly, to flexible spring members that includes a flexible wall and one or more indicia marked along a surface of the flexible wall. Such flexible spring members can be included in or otherwise form a part of gas spring assemblies, and one or more of such gas spring assemblies can be included in or otherwise form a part of suspension systems. Methods of manufacturing flexible spring members in accordance with the subject matter of the present disclosure are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

In some cases, the spring devices of a suspension system of a wheeled motor vehicle can be of the type referred to as a gas spring assembly, such as commonly have opposing end members with a flexible spring member secured therebetween in a substantially fluid-tight manner to form a spring chamber. It is generally desirable for gas spring assemblies to include identifying information thereon, such as manufacturer name, model number, serial number, batch or lot number, size characteristics and/or load capacity, for example. In some cases, such information may be molded or otherwise formed into a flexible wall of the flexible spring member. In such cases, however, the identifying information will be of the same color as the material from which the flexible wall is made. As a result, the identifying information on the flexible wall is often unreadable at distances of more than a few feet. Furthermore, the identifying information on the flexible wall may be difficult to read even at distances of a few feet or less.

In other cases, such identifying information may be printed directly on a flexible wall of the flexible spring member. Unfortunately, the type and kind of marking compounds (e.g., ink) that are commonly used tend not to be sufficiently durable to withstand the environmental conditions typically associated with the use of gas spring assemblies on a motor vehicle suspension system. That is, exposure to matter such as water, salt, dirt and other compounds as well as exposure to atmospheric conditions such as oxygen ($O_2$), ozone ($O_3$) and UV radiation typically cause the printed characters to be absorbed, washed off, faded or rendered otherwise unreadable. Thus, potentially causing a repair technician to have to undertake additional and, often, time consuming efforts to determine the identifying information, such as may be needed to procure a suitable replacement part or assembly, for example.

Notwithstanding the common practice of marking the flexible wall of flexible spring members of gas spring assemblies, it is believed that a need exists to advance the art of gas spring assemblies by developing marked flexible spring members having improved aesthetic appearance and/or durability as well as methods and/or techniques for performing achieving the same, while still retaining comparable or improved performance, ease of manufacture, and/or cost of manufacture.

BRIEF SUMMARY

One example of a flexible spring member in accordance with the subject matter of the present disclosure can be dimensioned for securement to an associated gas spring end member. The flexible spring member can be at least partially formed from elastomeric material and can have at least one of an inner surface and an outer surface. The flexible spring member can also include a marking disposed along at least one of the inner surface and the outer surface that includes one or more indicia. The marking can be at least partially formed by an indicia layer and an outer layer. The indicia layer can include one or more quantities of material that at least partially form the one or more indicia. The outer layer can be formed from a quantity of material that is disposed overtop of the indicia layer such that the one or more indicia of the indicia layer are substantially encapsulated along the one of the inner surface and the outer surface.

One example of a gas spring assembly in accordance with the subject matter of the present disclosure can include a flexible spring member and an end member. The flexible spring member can have a longitudinal axis and can extend peripherally about the axis and between longitudinally spaced-apart ends. The flexible spring member can be at least partially formed from elastomeric material and have an inner surface and an outer surface. The flexible spring member can also include a marking disposed along one of the inner surface and the outer surface that includes one or more indicia. The marking can be at least partially formed by an indicia layer and an outer layer. The indicia layer can include one or more quantities of material that at least partially form the one or more indicia that are disposed on or along the one of the inner surface and the outer surface. The outer layer can be formed from a quantity of material that is disposed overtop of the indicia layer such that the one or more indicia are substantially encapsulated along the one of the inner surface and the outer surface. The end member can be secured across one of the longitudinally spaced-apart ends such that a substantially fluid-tight connection can be formed between the flexible spring member and the end member such that the flexible spring member and the end member can together at least partially define a spring chamber of the gas spring assembly.

One example of a suspension system in accordance with the subject matter of the present disclosure can include a pressurized gas system that includes a pressurized gas source and at least one control device. The suspension system can also include one or more gas spring assemblies according to the foregoing paragraph in fluid communication with the pressurized gas system.

One example of a method of manufacturing a gas spring assembly in accordance with the subject matter of the present disclosure can include providing a flexible spring member that is at least partially formed from elastomeric material and has a surface. The method can also include forming a marking having one or more indicia along the surface. The action of forming a marking can include applying one or more quantities of material on or along the surface to form an indicia layer that at least partially forms the one or more indicia. The action of forming a marking can also include applying a quantity of material on or along the surface to form an outer layer disposed overtop of the indicia layer such that the one or more indicia are substantially encapsulated. The method can also include providing an end member and securing the end member on or along the flexible spring member such that a substantially fluid-tight seal is formed therebetween.

One example of a system operative to manufacture a flexible spring member in accordance with the subject matter of the present disclosure can include a base and a spindle rotatably supported on the base. The system can also include support members dimensioned to receivingly engage a flexible spring member. One or more dispensing heads can be disposed adjacent the spindle and operative to apply one or more materials and/or compounds on or along the flexible spring member to at least partially form one or more of an indicia layer, an outer layer and a base layer such that a marking can be formed on or along a surface of the flexible spring member.

In some cases, one or more of the indicia of a marking according to any one or more of the five (5) foregoing paragraphs can be at least partially formed from a quantity of colorant material that has a contrasting color to a color of the elastomeric material and is visually observable by the human eye.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
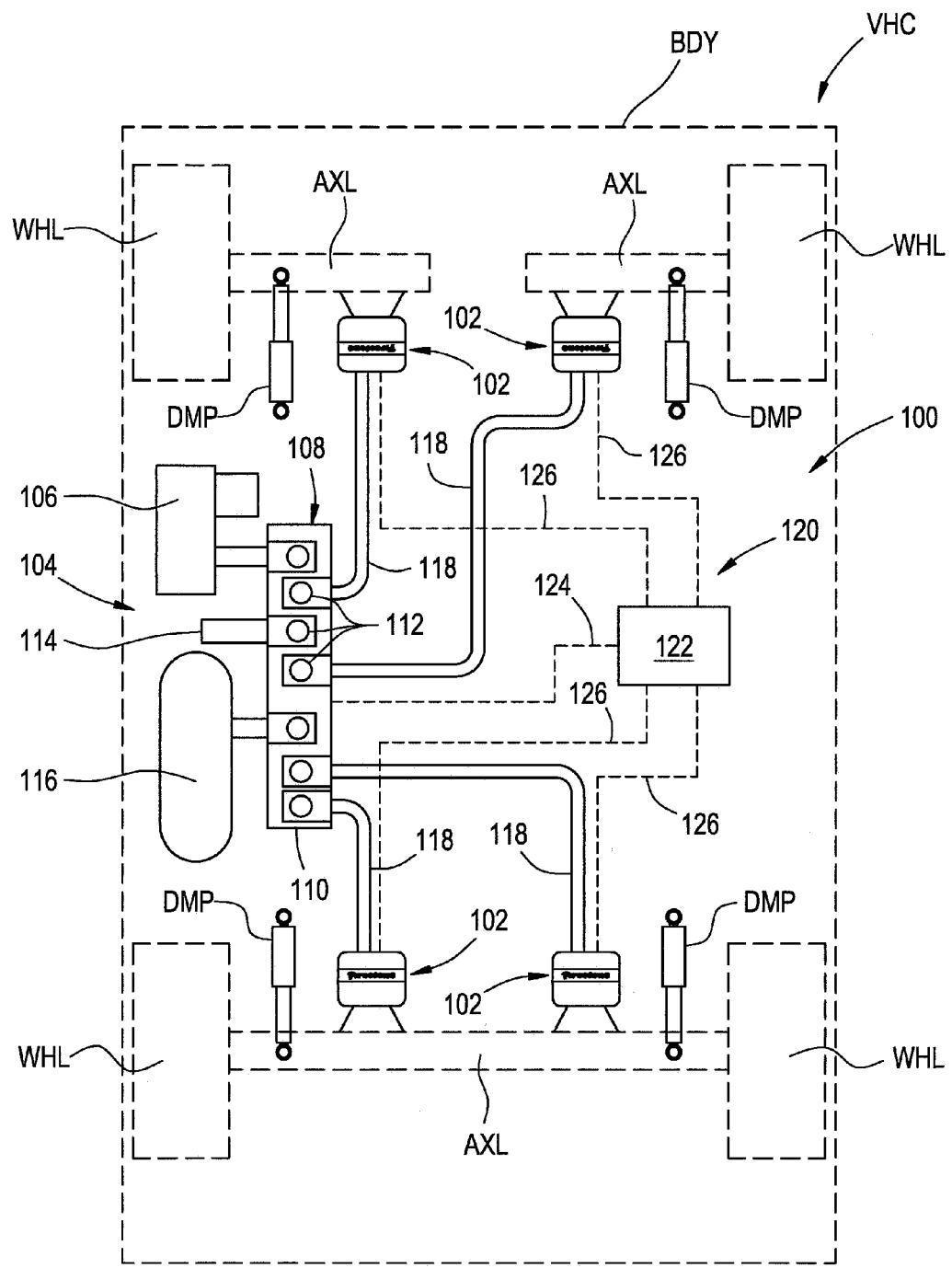
FIG. 1 is a schematic representation of one example of a suspension system of an associated vehicle that includes one or more gas spring assemblies in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will also be appreciated that such a suspension system of the vehicle can also, optionally, include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number (e.g., one or more) of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of any other type, kind and/or construction could alternately be used, such as a convoluted bellows-type construction (not shown), for example.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices (not shown in FIG. 1), such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom. The height sensing devices can be in communication with ECU 122 in any suitable manner, such as through conductors or leads 126, for example. Additionally, it will be appreciated that the height sensing devices can be of any suitable type, kind and/or construction.

Figure 2:
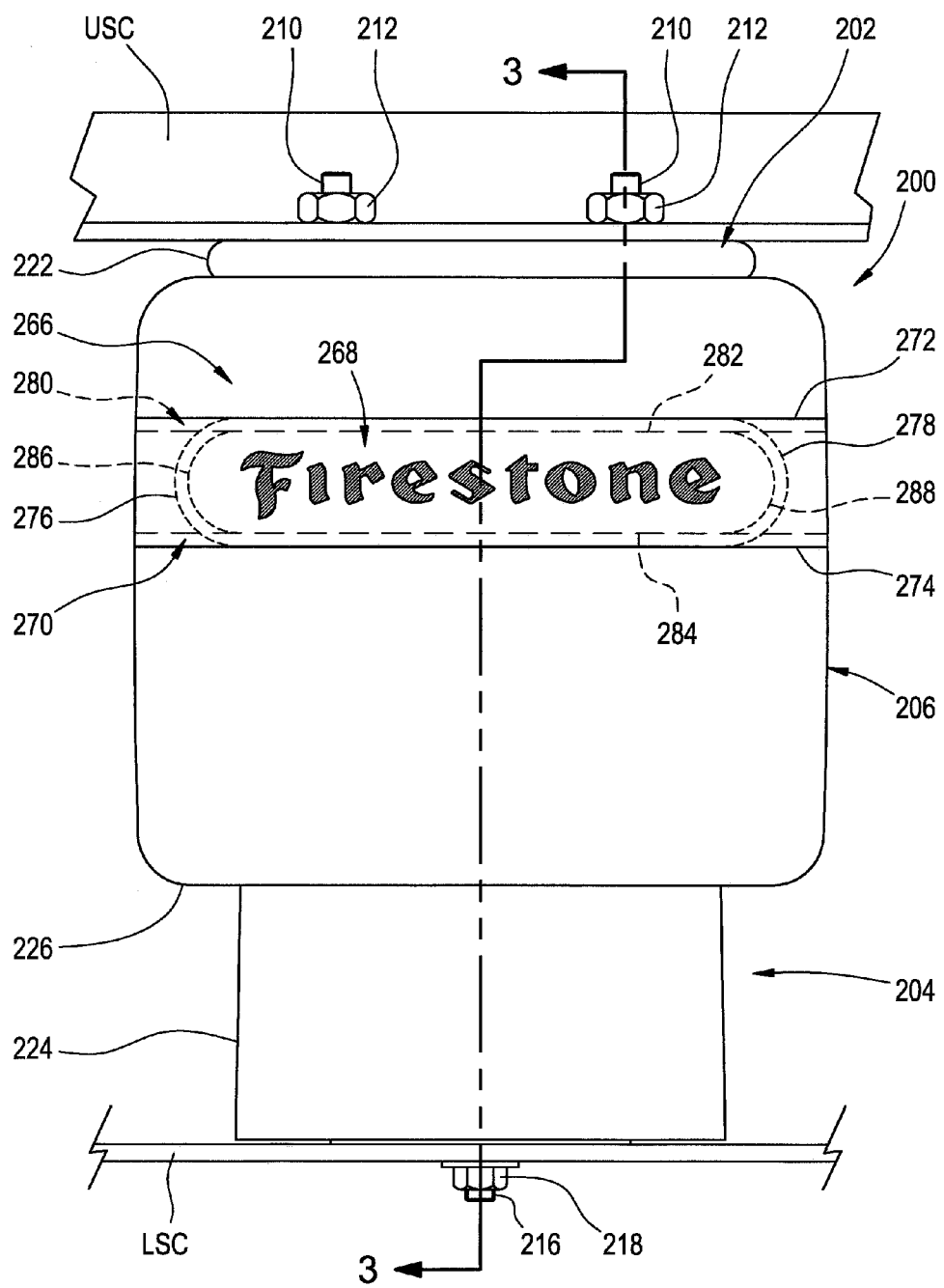
FIG. 2 is a side view of one example of a gas spring assembly in accordance with the subject matter of the present disclosure.
Figure 3:
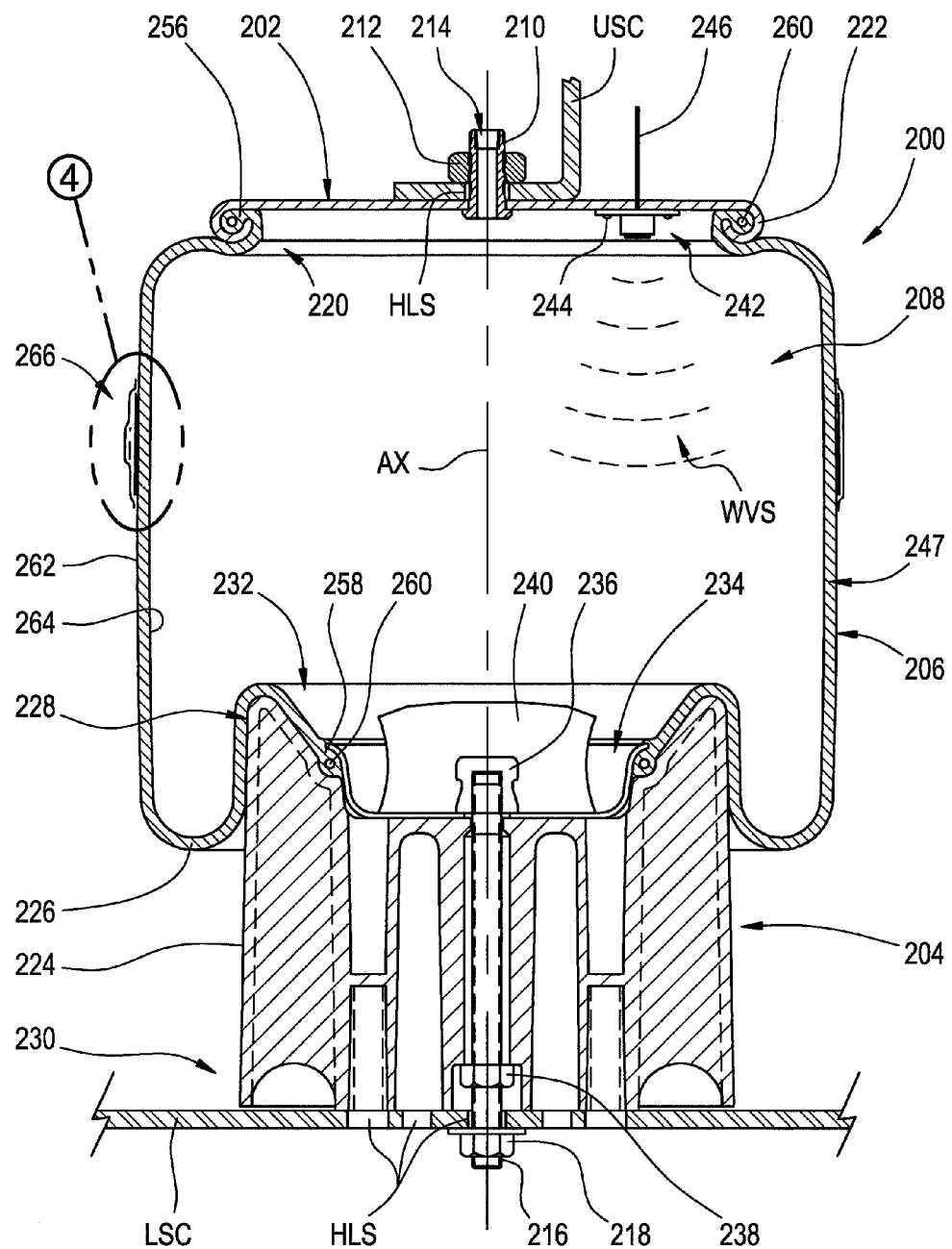
FIG. 3 is a cross-sectional side view of the gas spring assembly in FIG. 2 taken from along line 3-3 therein.

One example of a gas spring assembly including a flexible spring member in accordance with the subject matter of the present disclosure is shown in FIGS. 2 and 3 as gas spring assembly 200, such as may be suitable for use as one or more of gas spring assemblies 102 in FIG. 1, for example. Gas spring assembly 200 is shown as having a longitudinally-extending axis AX (FIG. 3) and can include one or more end members, such as an end member 202 and an end member 204 that is spaced longitudinally from end member 202. A flexible spring member 206 can extend peripherally around axis AX and can be secured between the end members in a substantially fluid-tight manner such that a spring chamber 208 (FIG. 3) is at least partially defined therebetween.

Gas spring assembly 200 can be disposed between associated structural components, such as the sprung and unsprung masses of an associated vehicle, for example, in any suitable manner. As one example, one end member can be operatively connected to the associated sprung mass with the other end member disposed toward and operatively connected to the associated unsprung mass. In the embodiment shown in FIGS. 2 and 3, for example, end member 202 is secured along a first or upper structural component USC, such as could represent associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS (FIG. 3) in upper structural component USC and can receive one or more threaded nuts 212 or other securement devices, for example. As an alternative to one or more of mounting studs 210, one or more threaded passages (e.g., blind passages and/or through passages) could be used in conjunction with a corresponding number of one or more threaded fasteners.

Additionally, one or more fluid communication ports can optionally be provided to permit fluid communication with spring chamber 208, such as may be used for transferring pressurized gas into and/or out of the spring chamber, for example. In the exemplary embodiment shown, a transfer passage 214 (FIG. 3) extends through at least one of mounting studs 210 and is in fluid communication with spring chamber 208. It will be appreciated, however, that any other suitable fluid communication arrangement could alternately be used.

End member 204 can be secured along a second or lower structural component LSC, such as could represent associated axle AXL in FIG. 1, for example, in any suitable manner. As one example, lower structural component LSC could include one or more mounting holes HLS (FIG. 3) extending therethrough. In such case, a mounting stud 216 could be operatively connected to end member 204 and could extend through one of mounting holes HLS to receive a corresponding threaded nut 218, for example.

It will be appreciated that the one or more end members can be of any suitable type, kind, construction and/or configuration, and can be operatively connected or otherwise secured to the flexible spring member in any suitable manner. In the exemplary arrangement shown in FIGS. 2 and 3, for example, end member 202 is of a type commonly referred to as a bead plate that is secured to a first end 220 of flexible spring member 206 using a crimped-edge connection 222. End member 204 is shown in the exemplary arrangement in FIGS. 2 and 3 as being of a type commonly referred to as a piston (or a roll-off piston) that has an outer side wall 224 that abuttingly engages flexible spring member 206 such that a rolling lobe 226 is formed therealong. As gas spring assembly 200 is displaced between extended and collapsed conditions, rolling lobe 226 is displaced along outer side wall 224 in a conventional manner.

As identified in FIG. 3, end member 204 extends generally between a first or upper end 228 and a second or lower end 230. One example of a connection between the flexible spring member and the end member is shown as including a second end 232 of flexible spring member 206 being secured on or along upper end 228 of end member 204 using an end closure 234. The end closure can be secured on or along end member 204 in any suitable manner. In the exemplary embodiment shown, a retaining nut 236 is threadably secured on mounting stud 216 and engages end closure 234. By securing mounting stud 216 on end member 204, such as by using a threaded nut 238, for example, the end closure can be drawn tight to upper end 228 to thereby secure second end 232 of the flexible spring member therebetween. In a preferred arrangement, a substantially fluid-tight seal can be formed between flexible spring member 206, such as along second end 232 thereof, for example, and at least one of end member 204 and end closure 234. It is to be understood, however, that the arrangement shown and described is merely exemplary and that any other suitable construction and/or configuration can alternately be used.

A jounce bumper 240 can, optionally, be supported within spring chamber 208, such as to inhibit direct contact between end members 202 and 204, for example. It will be appreciated that the jounce bumper, if included, can be supported on or along an end member in any suitable manner. For example, jounce bumper 240 is shown as being received on and retained by retaining nut 236.

A height or distance sensing device 242 is, optionally, shown in FIG. 3 as being disposed within spring chamber 208 along end member 202 and being secured thereto using suitable fasteners 244. Height sensing device 242 can be of any suitable type, kind and/or construction, such as an ultrasonic sensor that transmits and receives ultrasonic waves WVS, for example. Additionally, it will be appreciated that height sensing device 242 can be connected to other systems and/or components of a vehicle suspension system in any suitable manner. As shown in FIG. 3, height sensing device 242 includes a lead or connection 246 that can be used for such communication purposes, such as is indicated by leads 126 of control system 120 in FIG. 1, for example.

Flexible spring member 206 can include a flexible wall 247 that can extend between longitudinally between ends 220 and 232 and peripherally about axis AX to at least partially define spring chamber 208. It will be appreciated that flexible wall 247 can be formed in any suitable manner and from any suitable material or combination of materials, such as by using or otherwise including one or more fabric-reinforced, elastomeric plies or layers (not shown) and/or one or more un-reinforced, elastomeric plies or layers (not shown), for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used. In any case, the elastomeric material or materials from which the plies are formed will have certain material and/or mechanical properties, such as a durometer or hardness property, for example.

Figure 4:
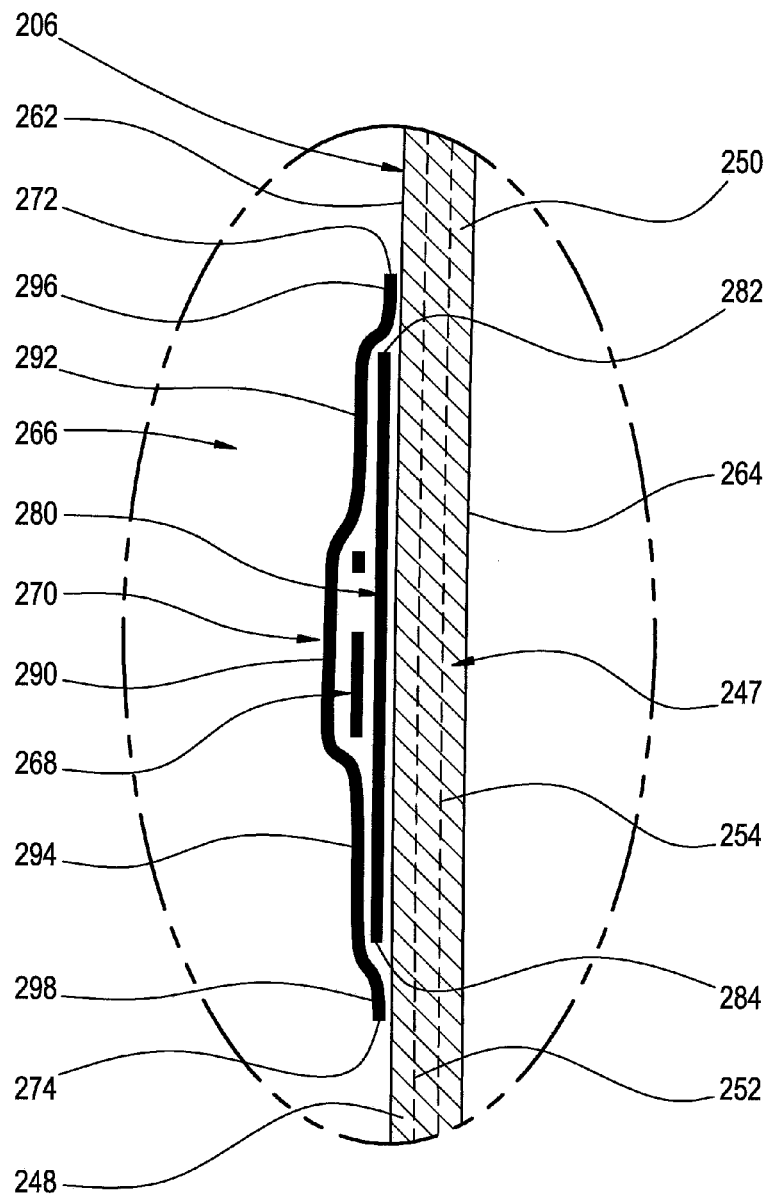
FIG. 4 is an enlarged view of the portion of the flexible spring member of the gas spring assembly shown in FIGS. 2 and 3 that is identified as Detail 4 in FIG. 3.

As identified in FIG. 4, flexible wall 247 includes an outer or cover ply 248, an inner or liner ply 250, and two reinforcing plies 252 and 254. The reinforcing plies can be of any suitable construction and/or configuration. For example, reinforcing plies 252 and 254 can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization, for example. Additionally, the one or more lengths of filament material can be oriented in any suitable manner, such as, for example, by having the filaments of one ply disposed at one bias angle and the filaments of another ply disposed at a different bias angle.

Additionally, a flexible spring member in accordance with the subject matter of the present disclosure can, optionally, include one or more mounting beads disposed along an end of the flexible wall. As illustrated in FIG. 3, flexible spring member 206 is shown as including two mounting bead with a mounting bead 256 disposed along end 220 and a mounting bead 258 disposed along end 232. Additionally, a flexible spring member in accordance with the subject matter of the present disclosure can, optionally, include at least one annular reinforcing element 260 embedded within one or more of the ends of the flexible wall, such as along the mounting beads thereof, for example.

Flexible wall 247 is shown as including an outer surface 262 and an inner surface 264, which can at least partially define spring chamber 208. In some cases, at least a portion of outer surface 262 can abuttingly engage outer side wall 224 of end member 204, such as may occur in connection with rolling-lobe constructions, for example.

Gas spring assemblies in accordance with the subject matter of the present disclosure, such as gas spring assemblies 102 and 200, for example, differ from conventional gas spring assemblies, at least, in that a gas spring assembly in accordance with the subject matter of the present disclosure includes a flexible spring member with a flexible wall or flexible wall portion that is marked with one or more indicia in one or more areas of the flexible wall or portion thereof. The one or more markings, which can include one or more indicia in the one or more areas, are are formed from two or more layers of material that are disposed on or along at least a portion of a surface of the flexible wall. Non-limiting examples of indicia can include any number and/or combination of one or more of graphics, logos, symbols, machine-readable data representations (e.g., bar codes, 2D data matrices), text and/or other identifying information, such as may take the form of alpha-numeric or other characters, for example.

In the arrangement shown in FIGS. 2-4, for example, flexible spring member 206 of gas spring assembly 200 includes a marking 266 in the form of a plurality of indicia (e.g., alphabetic characters) that are arranged to form the FIRESTONE® trademark. It will be appreciated, however, that any combination of other graphics, logos, symbols, machine-readable representations, text, numbers, characters and/or other identifying information could additionally, or alternately, be included. Additionally, it will be appreciated that the one or more markings can be disposed in any number of one or more areas on or along the inner and/or outer surfaces of the flexible spring member, such as markings disposed in peripherally-spaced and/or axially-spaced relation to one another.

The one or more markings that can be formed on or along the outer surface of a flexible spring member in accordance with the subject matter of the present disclosure can be formed from or otherwise include two or more coatings, applications, deposits and/or layers (any one or more of which may be referred to herein as "layers" either individually or in combination) of material that are disposed in at least partially overlapping relation to one another. That is, the two or more layers of material can be built-up overtop of one another on or along an area of the flexible spring member to form a marking in accordance with the subject matter of the present disclosure. In a preferred arrangement, one layer of material will be substantially encapsulated by one or more other layers of material. It will be appreciated, however, that other configurations and/or arrangements could alternately be used.

As one non-limiting example, FIGS. 2-4 illustrate flexible spring member 206 with marking 266 that includes an indicia layer 268 and an outer layer 270. Indicia layer 268 includes one or more graphics, logos, symbols, machine-readable data representations, text (e.g., alphabetic, numeric and/or other characters) and/or other identifying information formed from one or more inks, dyes, paints, stains and/or other colorants having one or more colors, and/or from one or more appliques and/or other sheet materials having one or more colors. In a preferred arrangement, one or more of the colors in indicia layer 268 will be colors that are different than the color of outer surface 262 of flexible wall 247 of flexible spring member 206. And, in a more preferred arrangement, the one or more colors of indicia layer 268 will have a substantially high contrast and/or visibility to the human eye relative to the color of outer surface 262, such as white-on-black, red-on-black and/or yellow-on-black, for example. In this manner, the indicia formed on or along indicia layer 268 can, in a preferred arrangement, be visually observable on the flexible spring member of the gas spring assembly.

Outer layer 270 is shown in FIGS. 2-4 as being disposed over top of indicia layer 268 and extending axially between layer edges 272 and 274. In a preferred arrangement, layer edges 272 and 274 are disposed axially outwardly of indicia layer 268. Additionally, outer layer 270 can, in some cases, extend peripherally about all or substantially all of outer surface 262 between layer edges 272 and 274. That is, outer layer 270 can, in some cases, form an endless annular layer or band around flexible spring member 206. In other cases, outer layer 270 can extend between peripherally-spaced layer ends 276 and 278. It will be appreciated, however, that, in such case, layer ends 276 and 278 are spaced peripherally outwardly from indicia layer 268, such as is shown in FIG. 2, for example.

Additionally, or in the alternative, a marking (e.g., marking 266) in accordance with the subject matter of the present disclosure can, optionally, include a base layer 280 at least a portion of which is disposed on or along outer surface 262 of flexible spring member 206. If provided, base layer 280 can extend axially between layer edges 282 and 284. In some cases, base layer 280 can extend peripherally about all or substantially all of outer surface 262 between layer edges 282 and 284. In other cases, base layer 280 can extend between peripherally-spaced layer ends 286 and 288. In a preferred arrangement, layer edges 282 and 284 of base layer 280, if provided, can be disposed axially outwardly of indicia layer 268 such that the indicia layer is disposed on or along the base layer. Base layer 280 can be formed from any suitable compound, material or combination of compounds and/or materials.

As indicated above, base layer 280, if provided, can expand on or along the outer surface of the flexible wall of the flexible spring member. In a preferred arrangement, base layer 280 is disposed in direct contact with outer surface 262 of flexible wall 247 of flexible spring member 206. In this manner, the base layer can inhibit or at least reduce the contamination, discoloration and/or degradation of indicia layer 268 by oils, waxes and/or other compounds that may reside in or may otherwise be components of the flexible materials (e.g., natural rubbers, synthetic rubbers and/or thermoplastic elastomers) from which the flexible wall is at least partially formed. In some cases, base layer 280 can inhibit or at least reduce the migration of such oils, waxes and/or other compounds out of the material of the flexible wall. In this manner, base layer 280 can, in some cases, function to lock-in or otherwise retain such oils, waxes and/or other compounds within the material of the flexible wall of the flexible spring member.

Outer layer 270 can be disposed on or along at least a portion of indicia layer 268 such that the indicia layer is at least partially covered by the outer layer. In a preferred arrangement, however, outer layer 270 will substantially-entirely cover indicia layer 268 and will be disposed in direct contact with outer surface 262 of the flexible wall and/or another layer of marking 266, such as base layer 280, for example. In this manner, indicia layer 268 can be substantially-entirely encapsulated by the outer layer together with any additional layers of marking 266 that may be included.

As a non-limiting example, outer layer 270 of marking 266 is identified in FIG. 4 as having a portion 290 disposed in direct contact with indicia layer 268, a portion 292 disposed toward layer edge 272 in direct contact with base layer 280 and a portion 294 disposed toward layer edge 274 in direct contact with base layer 280. In such case, indicia layer 268 can be substantially encapsulated between outer layer 270 and base layer 280. Additionally, or in the alternative, outer layer 270 can, optionally, include a portion 296 adjacent layer edge 272 in direct contact with outer surface 262 of flexible spring member 206 and a portion 298 adjacent layer edge 274 in direct contact with the outer surface of the flexible spring member. In cases in which base layer 280 is not provided, portions 296 and 298 of outer layer 270 can substantially encapsulate indicia layer 268. It will be appreciated that outer layer 270 can be formed from any compound, material or combination of compounds and/or materials that may be suitable for protecting the indicia layer and/or otherwise inhibiting or at least reducing contamination, discoloration and/or degradation of the indicia layer such as may occur due to exposure to matter such as water, salt, dirt and other compounds as well as exposure to atmospheric conditions such as oxygen ($O_2$), ozone ($O_3$) and/or UV radiation. In a preferred arrangement, outer layer 270 can be formed from a transparent and/or translucent material such that the one or more indicia of indicia layer 268 can be visually observed by the human eye through the outer layer.

Figure 4A:
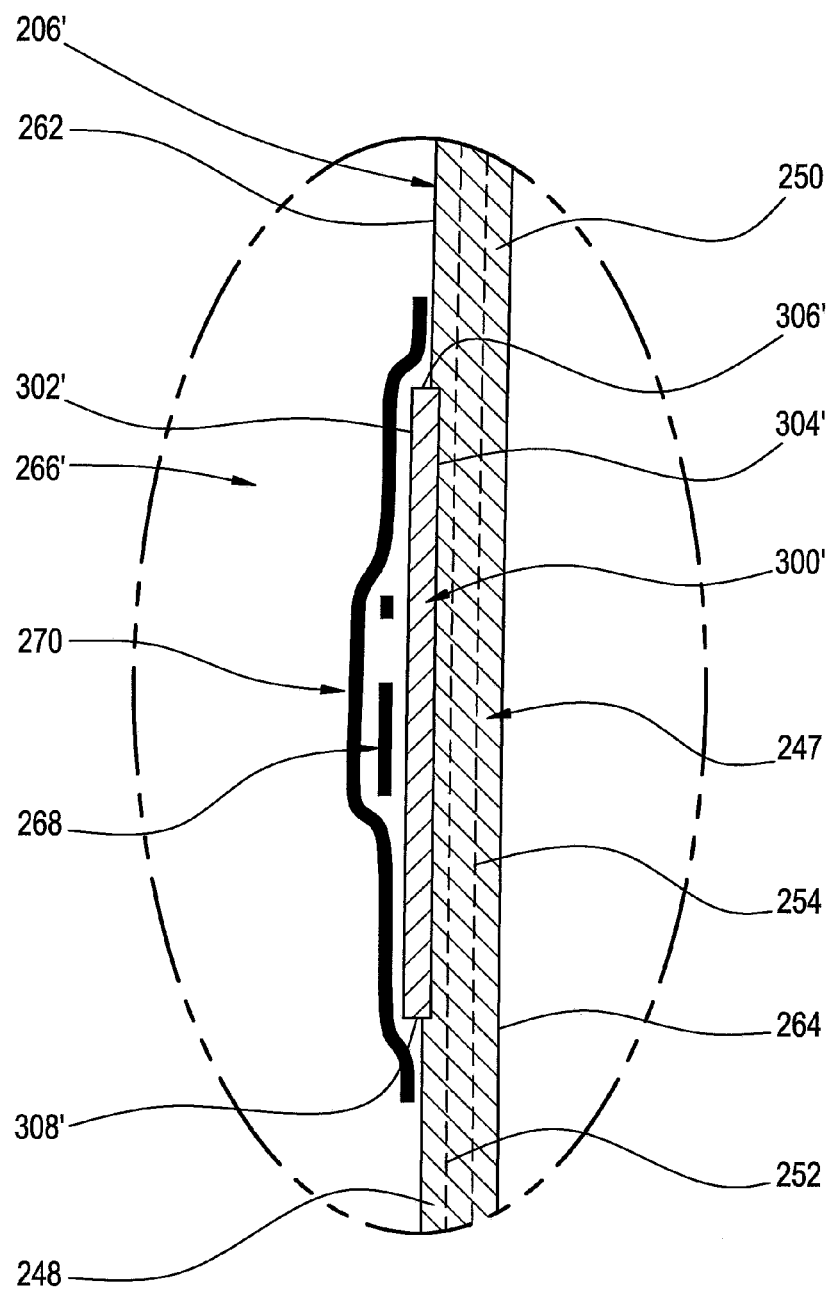
FIG. 4A is an enlarged view of an alternate configuration of the portion of the flexible spring member shown in FIG. 4.

An alternate arrangement of flexible spring member 206 is illustrated in FIG. 4A and is identified as flexible spring member 206' that includes a flexible wall 247' with outer or cover ply 248, inner or liner ply 250, and reinforcing plies 252 and 254. Flexible spring member 206' is also shown as including outer surface 262 and inner surface 264 with a marking 266' in accordance with the subject matter of the present disclosure disposed along outer surface 262. Marking 266' includes an indicia layer 268 and an outer layer 270, such as have been described above in detail. Marking 266' can also include a base layer 300' that is disposed on or along flexible wall 247' of flexible spring member 206'. Base layer 300' can include opposing surfaces 302' and 304' and can extend axially between layer edges 306' and 308'. In some cases, base layer 300' can extend peripherally about all or substantially all of flexible spring member 206' between layer edges 306' and 308'. In other cases, base layer 300' can extend between peripherally-spaced layer ends (not shown), such as have been illustrated in FIG. 2 by layer ends 286 and 288 of base layer 280, for example. In a preferred arrangement, layer edges 306' and 308' of base layer 300' can be disposed axially outwardly of indicia layer 268 such that the indicia layer is substantially-entirely disposed on or along the base layer. It will be appreciated that, in some cases, base layer 280 can be used together with base layer 300' and that, in other cases, base layer 300' may be used as an alternative to base layer 280.

Base layer 300' differs from base layer 280 in that base layer 300' is formed from a length or section of flexible material, such as a natural rubber, synthetic rubber or thermoplastic elastomer, for example, that has properties and/or characteristics suitable for inhibiting or at least reducing the migration of such oils, waxes and/or other compounds out of the material of flexible wall 247' of flexible spring member 206'. In some cases, base layer 300' may be formed from a compound, material or combination of compounds and/or materials that contain reduced levels of oils, waxes and/or other elements, which may minimize the migration of such elements into indicial layer 268. Additionally, base layer 300' can, in some cases, be formed from a material that can be assembled together with the other plies of flexible wall 247' in an uncured condition and cured (e.g., vulcanized) together with the other plies to form a finished flexible wall or flexible wall assembly of flexible spring member 206'. In such case, base layer 300' may be at least partially embedded within an adjacent ply of the flexible wall, such as ply 248 of flexible wall 247' as is shown in FIG. 4A, for example. In such an arrangement, surface 304' and at least a portion of layer edges 306' and 308' can be disposed in direct contact with ply 248 of flexible wall 247'. In other cases, base layer 300' can be secured on or along the outer surface of the flexible spring member in a suitable manner, such as by way of a flowed-material joint (not shown), for example. In such cases, surface 304' can be disposed in abutting engagement with outer surface 262 of the flexible spring member.

It will be appreciated that layers 268, 270, 280 and 300' are shown in FIGS. 2-4A as having exaggerated dimensions and spacing for purposes of ease of identification and understanding. The layers are not to scale and are, as described herein, generally intended to be in direct contact with one another. As such, it is to be understood that the spaces shown between adjacent layers are merely to permit easy identification of individual layers and is not intended to illustrate a combination of layers that are disposed in spaced-apart relation to one another.

Is it will be appreciated that layers 268, 270, 280 and/or 300' can take any suitable form or configuration and can be applied on or along the flexible spring member in any suitable manner. As one example, layers 268 and 270 as well as layer 280, if provided, can be applied as liquid or semi-solid compounds. As another example, layers 268 and 270 as well as one or more of layers 280 and 300' can take the form of one or more sections of sheet material that are applied along and adhered to or otherwise disposed along the outer surface of the flexible spring member. As a further example, layers 268, 270, 280 and/or 300' can be formed from a combination of liquid or semi-solid compounds and one or more sections of sheet material.

Figure 5:
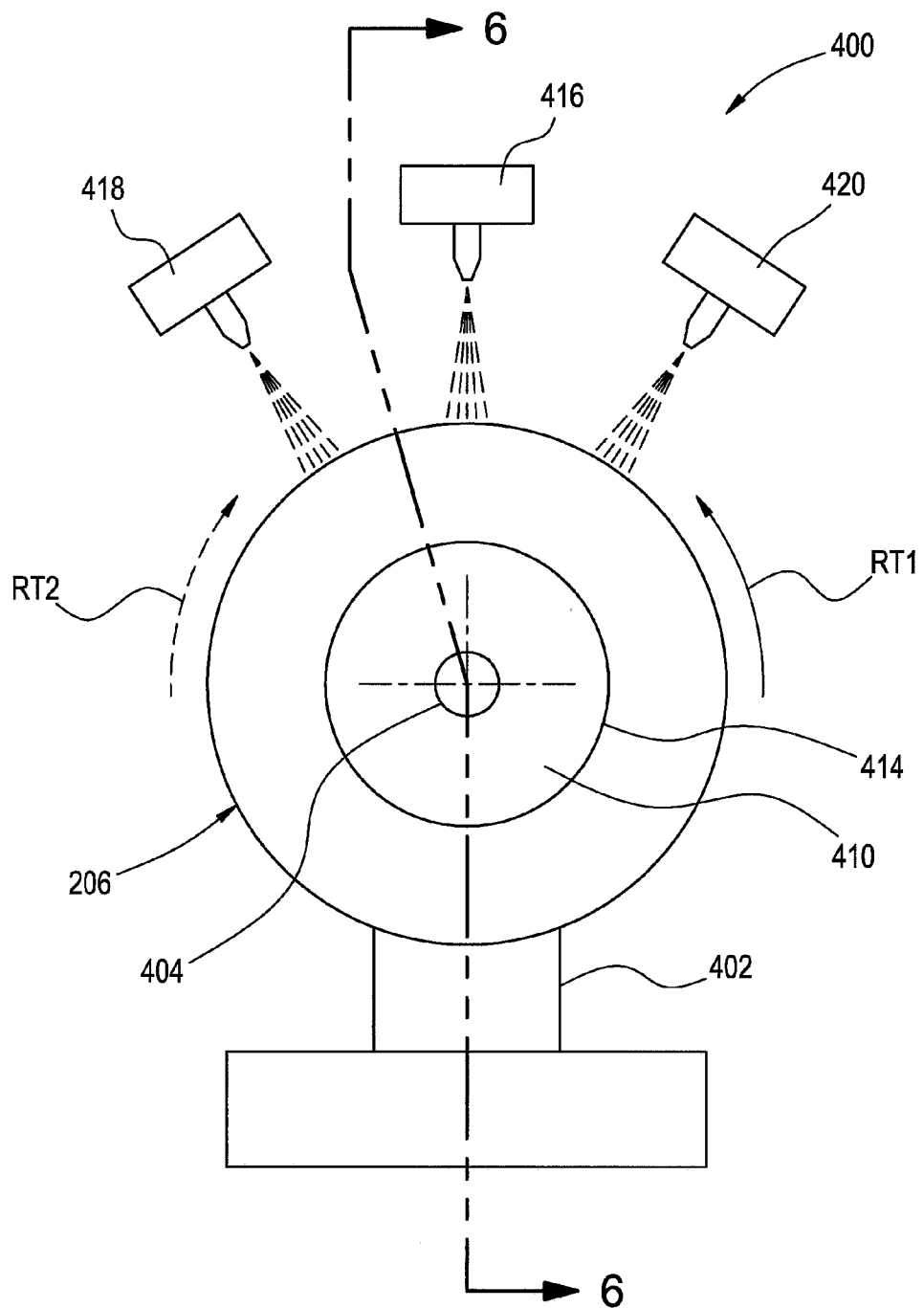
FIG. 5 is a front elevation view of one example of a system applying indicia along an exterior surface of a flexible spring member in accordance with the subject matter of the present disclosure.
Figure 6:
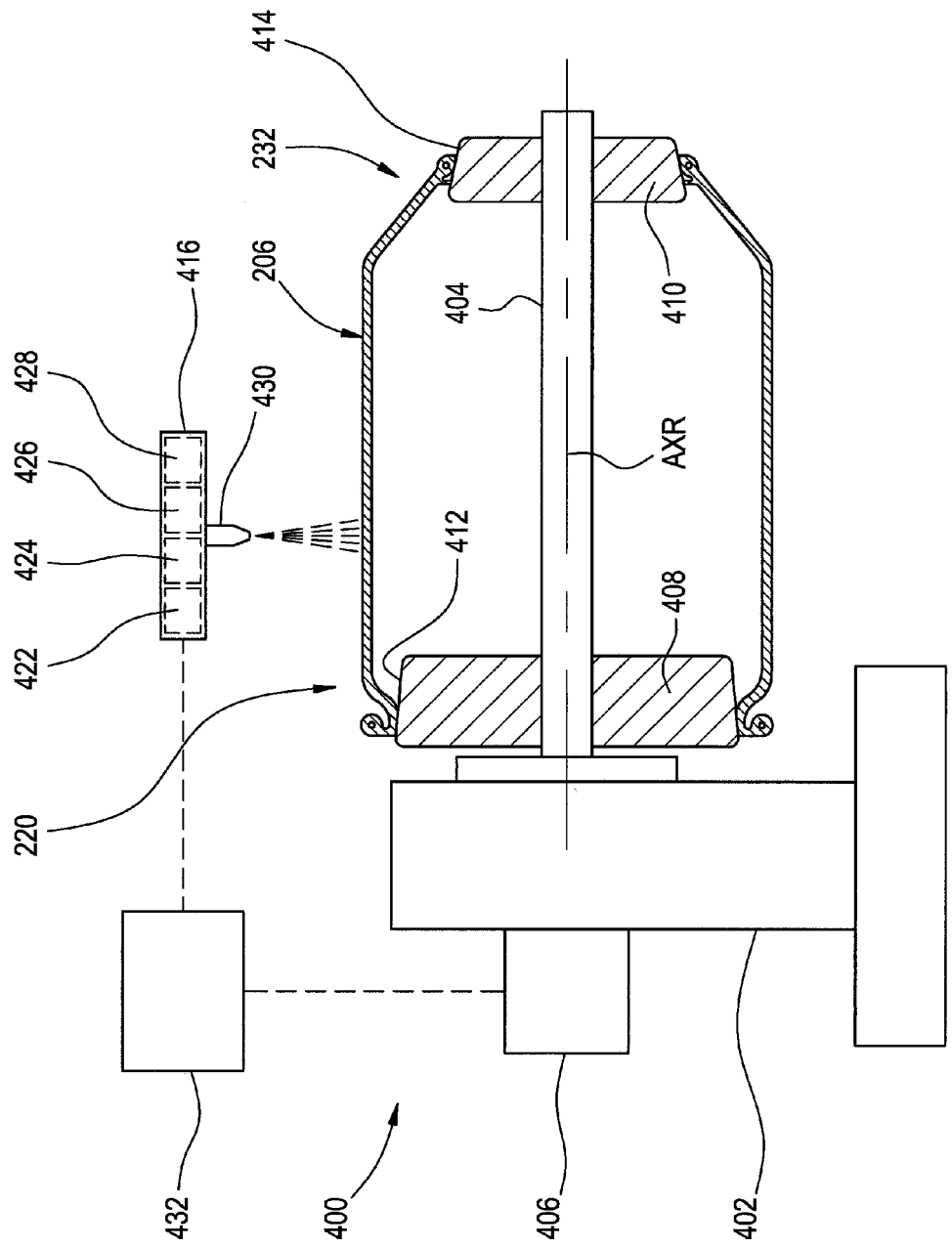
FIG. 6 is a side elevation view, in partial cross-section, of the system and flexible spring member in FIG. 5 with the partial cross-section taken from along line 6-6 thereof.

One example of a system 400 that is suitable for forming a marking in accordance with the subject matter of the present disclosure (e.g., marking 266) on or along a flexible spring member (e.g., flexible spring member 206 and/or 206') is shown in FIGS. 5 and 6. System 400 includes a base 402 having a spindle 404 that is rotatably supported on the base. A motor 406 can drivably engage spindle 404 to rotate the spindle around an axis AXR relative to base 402, such as is represented in FIG. 5 by arrows RT1 and RT2. System 400 also includes support members 408 and 410 that are supported on or along spindle 404, and can be secured thereto in a manner suitable for rotation of the support members with the spindle. Support members 408 and 410 also include outer surfaces 412 and 414, respectively, that are dimensioned to receive and abuttingly engage the opposing ends of a flexible spring member. In the arrangement shown in FIGS. 5 and 6, flexible spring member 206 is shown as being disposed in abutting engagement with the support members with end 220 disposed along outer surface 412 and end 232 disposed along outer surface 414. It will be appreciated, however, that other configurations and/or arrangements could alternately be used.

System 400 can also include one or more dispensing heads that may be suitable for spraying, dispensing or otherwise applying a liquid or semi-solid compound or material on or along the outer surface of the flexible spring member. In the arrangement shown in FIGS. 5 and 6, system 400 includes a dispensing head 416 suitable for spraying, dispensing or otherwise applying compounds and/or materials suitable for forming an indicia layer (e.g., indicia layer 268) on or along the flexible spring member. System 400 can also include a dispensing head 418 suitable for spraying, dispensing or otherwise applying compounds and/or materials suitable for forming an outer layer (e.g., outer layer 270) overtop of or otherwise at least partially covering the indicia layer. In some cases, system 400 can, optionally, include a dispensing head 420 suitable for spraying, dispensing or otherwise applying compounds and/or materials suitable for forming a base layer (e.g., base layer 280) on or along the outer surface of the flexible spring member. It will be appreciated that rotation of the flexible spring member in the direction indicated by arrow RT1 will result in the sequential application of a base layer, an indicia layer and an outer layer, such as has been described above in connection with marking 266.

As indicated above, indicia layer 268 can be formed from one or more inks, dyes, paints, stains and/or other colorants having one or more colors, and/or from one or more appliques and/or other sheet materials having one or more colors. One non-limiting example of a suitable colorant for forming an indicia layer can include liquid colorant (e.g., ink) that is formulated to be ejected or otherwise delivered through conventional dispensing nozzles. As such, dispensing head 416 is shown as including a plurality of colorant reservoirs 422, 424, 426 and 428 that are in fluid communication with a dispensing nozzle 430. In a preferred arrangement, reservoirs 422-428 contain different colored colorants (e.g., inks) that can be dispensed in any suitable manner to print, mark or otherwise generate an indicia layer, such as indicia layer 268. System 400 can also include a control system 432 is communicatively coupled with motor 406 and dispensing heads 416, 418 and 420. Control system 432 can selectively operate motor 406 to rotate flexible spring member 206 and can selectively actuate dispensing heads 416, 418 and/or 420 to form the one or more layers of a marking in accordance with the subject matter of the present disclosure.

Figure 7:
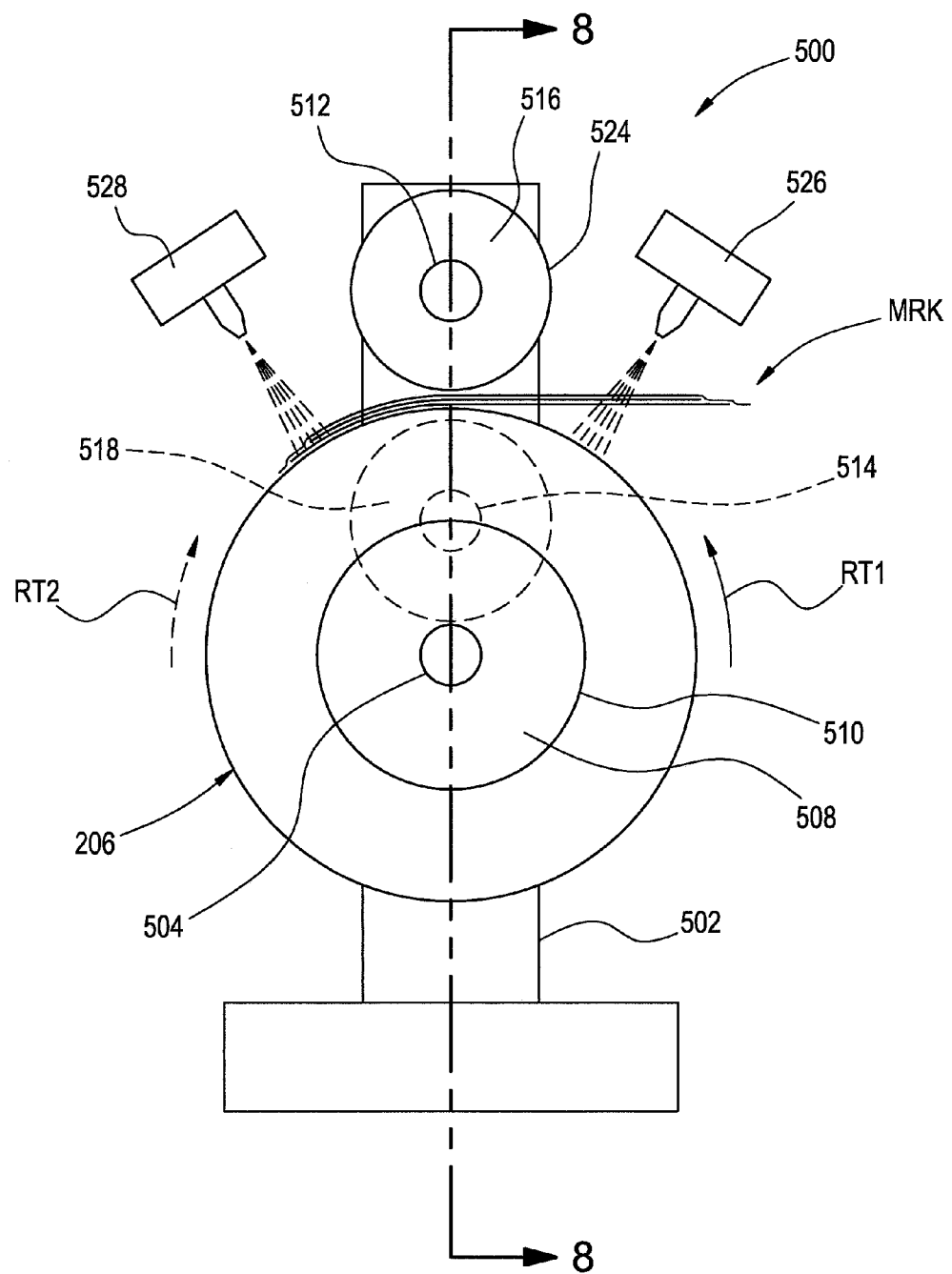
FIG. 7 is a front elevation view of another example of a system applying indicia along an exterior surface of a flexible spring member in accordance with the subject matter of the present disclosure.
Figure 8:
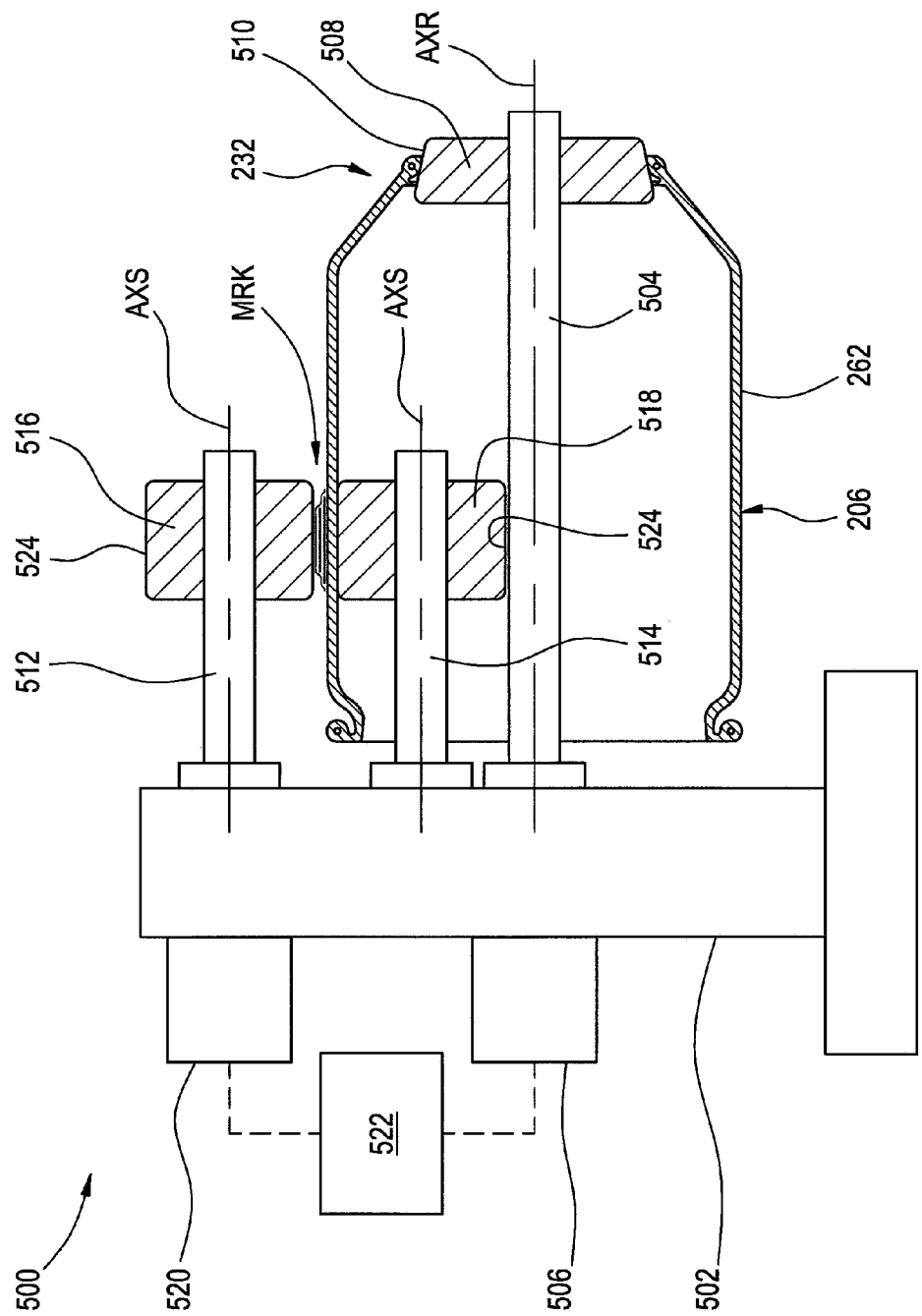
FIG. 8 is a side elevation view, in partial cross-section, of the system and flexible spring member in FIG. 7 with the partial cross-section taken from along line 8-8 thereof.

Another example of a system 500 that is suitable for forming a marking in accordance with the subject matter of the present disclosure (e.g., marking 266 or 266') on or along a flexible spring member (e.g., flexible spring member 206 and/or 206') is shown in FIGS. 7 and 8. System 500 includes a base 502 having a spindle 504 that is rotatably supported on the base. A motor 506 can drivably engage spindle 504 to rotate the spindle around an axis AXR relative to base 502, such as is represented in FIG. 7 by arrows RT1 and RT2. System 500 also includes a support member 508 that is supported on or along spindle 504, and can be secured thereto in a manner suitable for rotation of the support member with the spindle. Support member 508 includes an outer surface 510 that is dimensioned to receive and abuttingly engage an end of a flexible spring member. In the arrangement shown in FIGS. 7 and 8, flexible spring member 206 is shown as being disposed in abutting engagement with the support member with end 232 disposed along outer surface 510. It will be appreciated, however, that other configurations and/or arrangements could alternately be used.

System 500 can also include roller shafts 512 and 514 that are rotatably supported on base 502 for rotation about axes AXS. Rollers 516 and 518 can be respectively supported on or along rollers shafts 512 and 514. In some cases, the rollers and/or roller shafts can be freely rotatable about axes AXS. In other cases, however, one or more of the roller and roller shaft combinations can be driven, such as by way of a motor 520, for example, which is shown in FIG. 8 as drivably engaging roller shafts 512. A control system 522 can be communicatively coupled with motors 506 and/or 520 for selective operation thereof, such as to rotate the flexible spring member about axis AXR of spindle 504.

Rollers 516 and 518 can include outer surfaces 524 and are preferably spaced apart from one another such that a portion of flexible spring member 206 can be disposed therebetween. In a preferred arrangement, at least one of the outer surfaces of rollers 516 and 518 will abuttingly engage flexible spring member 206. In this manner, a pre-constructed marking or a pre-constructed portion of a marking can be introduced between the outer surface of the flexible spring member and the outer surface of a roller such that the pre-constructed marking or portion thereof can be biased against the outer surface of the flexible spring member by the roller and thereby applied to the flexible spring member. In the arrangement shown in FIGS. 7 and 8, for example, at least a portion of a pre-constructed marking MRK is disposed between outer surface 262 of flexible spring member 206 an outer surface 524 of roller 516. As flexible spring member 206 is rotated in the direction of arrow RT1, pre-constructed marking MRK is applied to the flexible spring member. System 500 can, optionally, include one or more dispensing heads that may be suitable for spraying, dispensing or otherwise applying a liquid or semi-solid compound or material on or along the outer surface of the flexible spring member. In the arrangement shown in FIGS. 7 and 8, system 500 includes dispensing heads 526 and 528 may be suitable for spraying, dispensing or otherwise applying compounds and/or materials, such as adhesives or bonding agents and/or such as may be suitable for forming an indicia layer (e.g., indicia layer 268), an outer layer 270 and/or a base layer 280 on or along the flexible spring member.

Figure 9:
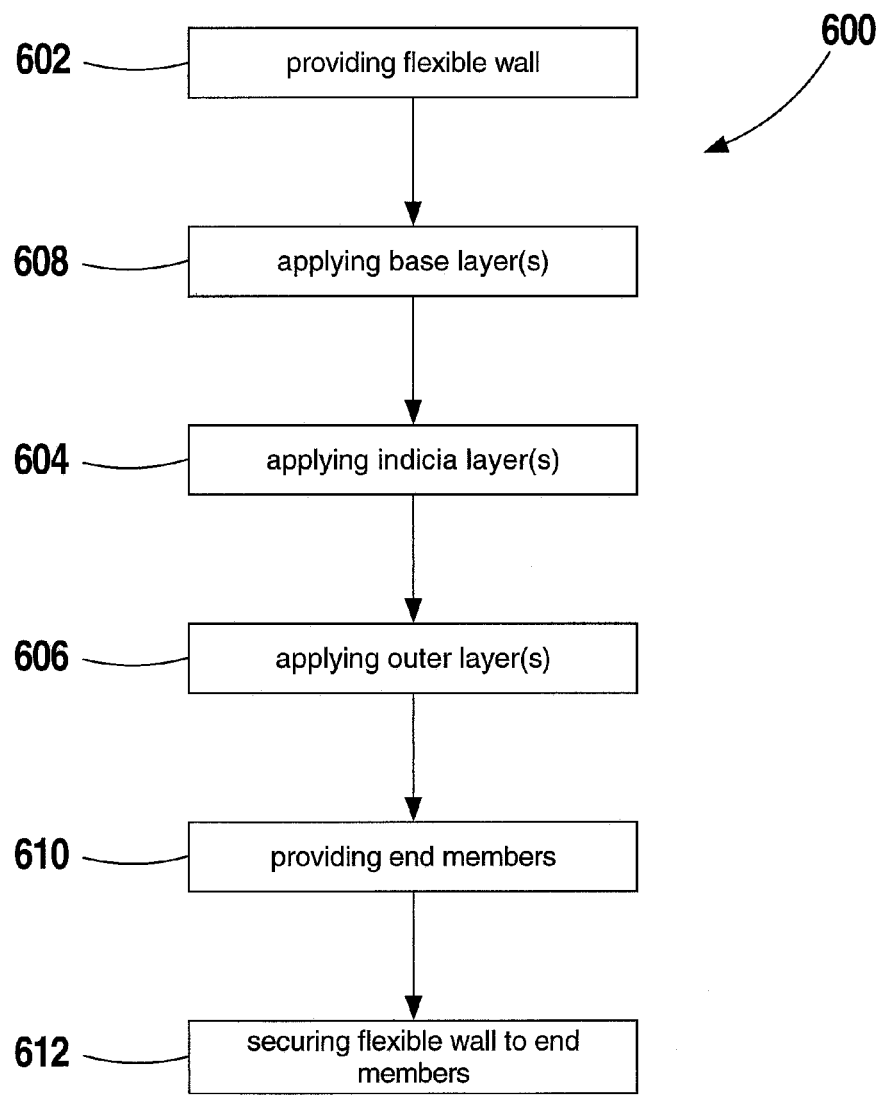
FIG. 9 is a graphical representation of one example of a method of manufacturing a gas spring assembly in accordance with the subject matter of the present disclosure.

FIG. 9 illustrates one example of a method 600 of manufacturing a flexible spring member, such as flexible spring member 206 and/or 206', for example, that is suitable for use in forming a gas spring assembly, such as one of gas spring assemblies 102 (FIG. 1) and/or 200 (FIGS. 2 and 3), for example. Method 600 can include providing a flexible spring member (e.g., flexible spring member 206) along which one or more markings are to be formed in accordance with the subject matter of the present disclosure, such as is represented by item number 602. Method 600 can also include applying one or more indicia layers (e.g., indicia layer 266 and/or 266') in one or more areas on or along a surface (e.g., outer surface 262 and/or inner surface 264) of the flexible spring member, such as is represented by item number 604. Method 600 can further include applying one or more outer layers (e.g., outer layer 270) in one or more areas on or along the surface of the flexible spring member and preferably at least partially covering one or more indicia layers, such as is represented in FIG. 9 by item number 606. Method 600 can optionally include applying one or more base layers (e.g., base layer 280 and/or 300') prior to applying the one or more indicia layers and/or the one or more outer layers, such as is represented by item number 608.

In some cases, method 600 can also, optionally include drying or otherwise securing one or more of the layers. Method 600 can further include providing one or more end members, such as one or more of end members 202 and/or 204, for example, such as is represented in FIG. 9 by item number 610. Method 600 can also include securing the flexible spring member to one or more of the end members (e.g., one or more of end members 202 and/or 204), such as is represented by item number 612, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A flexible spring member dimensioned for securement to an associated gas spring end member, said flexible spring member comprising:
   a flexible wall at least partially formed from elastomeric material and including at least one surface; and,
   a marking including one or more indicia disposed along said surface, said marking being at least partially formed by a combination of an indicia layer and an outer layer, said indicia layer including one or more quantities of material that at least partially form said one or more indicia, and said outer layer including a quantity of material that is disposed overtop of said indicia layer such that said one or more indicia of said indicia layer are substantially encapsulated along said surface.

2. A flexible spring member according to claim 1, wherein said indicia layer is disposed on surface of said flexible wall and said outer layer extends along said surface of said flexible wall outwardly beyond said indicia layer to substantially encapsulate said indicia layer.

3. A flexible spring member according to claim 1, wherein one of said flexible wall and said marking includes a base layer and said indicia layer of said marking is disposed on said base layer such that said base layer is interposed between said flexible wall and said indicia layer.

4. A flexible spring member according to claim 3, wherein said outer layer extends along said base layer outwardly beyond said indicia layer to substantially encapsulate said indicia layer.

5. A flexible spring member according to claim 3, wherein said outer layer extends along said surface of said flexible wall outwardly beyond said indicia layer and said base layer to substantially encapsulate said indicia layer and said base layer.

6. A flexible spring member according to claim 3, wherein said base layer is disposed along said surface of said flexible wall.

7. A flexible spring member according to claim 3, wherein said base layer is at least partially embedded within said flexible wall.

8. A flexible spring member according to claim 3, wherein said base layer is at least partially formed from a quantity of material suitable for inhibiting migration of compounds from said elastomeric material of said flexible wall into said indicia layer.

9. A flexible spring member according to claim 1, wherein said flexible wall has a color and said indicia layer includes one or more quantities of colorant material of having a contrasting color to said color of said flexible wall.

10. A flexible spring member according to claim 1, wherein said indicia layer is at least partially formed from a quantity of colorant material selected from the group consisting of inks, dyes, paints, stains, appliques and sheet materials.

11. A flexible spring member according to claim 1, wherein said outer layer is at least partially formed from a quantity of material suitable for inhibiting degradation of said indicia layer due to exposure one or more of oxygen ($O_2$), ozone ($O_3$) and UV radiation.

12. A gas spring assembly comprising:
   a flexible spring member being at least partially formed from elastomeric material and having a longitudinal axis, said flexible spring member extending peripherally about said longitudinal axis and between longitudinally spaced-apart ends, and said flexible spring member including an inner surface and an outer surface;
   a marking including one or more indicia disposed along one of said inner surface and said outer surface, said marking being at least partially formed by a combination of an indicia layer and an outer layer, said indicia layer including one or more quantities of material that at least partially form said one or more indicia, and said outer layer including a quantity of material that is disposed overtop of said indicia layer such that said one or more indicia of said indicia layer are substantially encapsulated along said one of said inner surface and said outer surface; and,
   an end member secured across one of said longitudinally spaced-apart ends in a substantially fluid-tight manner such that a spring chamber is at least partially defined by said flexible spring member and said end member.

13. A gas spring assembly according to claim 12, wherein said end member is a first end member and said gas spring assembly further comprises a second end member secured across the other of said longitudinally spaced-apart ends in a substantially fluid-tight manner, said second end member including an outer side wall with at least a portion of said flexible spring member forming a rolling lobe displaceable along said outer side wall.

* * * * *